United States Patent Office 3,341,589
Patented Sept. 12, 1967

3,341,589
PROCESS FOR PREPARING OXIMES
Lawrence R. Jones, Terre Haute, Ind., assignor to Commercial Solvents Corporation, New York, N.Y., a corporation of Maryland
No Drawing. Filed July 6, 1965, Ser. No. 469,928
6 Claims. (Cl. 260—566)

This invention relates to a process for the production of non-cyclic, aliphatic oximes. In a particular aspect this invention relates to a process for the production of non-cyclic, aliphatic oximes by the reaction of a water-soluble alkali metal salt of a non-cyclic, aliphatic, secondary nitroparaffin with oxalic acid.

Non-cyclic, aliphatic oximes have a wide variety of uses. Oximes such as methyl ethyl ketoxime and acetone oxime find special use as anti-skinning agents in coatings. Oximes are obtained by a wide variety of methods. In U.S. Patent 3,136,756, issued June 9, 1964, it is disclosed that a particular cyclic oxime, cyclohexanone oxime is produced by the reaction of an alkali metal salt of nitrocyclohexane with formic acid in the presence of a reducing agent such as sulfur dioxide.

It is an object of the present invention to provide a process for the production of non-cyclic, aliphatic oximes.

Further objects and advantagees of the present invention will be apparent from the specification and the appended claims.

It has been discovered in accordance with the present invention that non-cyclic, aliphatic oximes are obtained by reacting a water-soluble alkali metal salt of a non-cyclic, aliphatic, secondary nitroparaffin with oxalic acid. The present invention does not require the use of a reducing agent such as sulfur dioxide.

The term "secondary nitroparaffin" means a nitroparaffin wherein the nitro group is attached to a carbon atom which is in turn attached to two and not more than two carbon atoms. Typical nitroparaffins are represented by the formula

wherein R is an alkyl radical having from 1 up to about 3 carbon atoms. Representative nitroparaffins include 2-nitropropane, 2-nitrobutane, 2-nitropentane, 3-nitrohexane, 4-nitroheptane, etc. and the like. Oximes prepared from alkali metal salts of such typical nitroparaffins are represented by the formula

wherein R is an alkyl radical having from 1 up to about 3 carbon atoms. Representative oximes include methyl ethyl ketoxime, acetone oxime, methyl propyl ketoxime, ethyl propyl ketoxime, dimethyl ketoxime, dipropyl ketoxime, etc., and the like.

The alkali metal salts of use in the present invention (nitroparaffin salts) may be prepared by any suitable method. For example, one mole of 2-nitropropane may be dissolved in an aqueous or a methanolic solution containing one mole of sodium hydroxide to obtain the sodium salt of 2-nitropropane. In a similar manner the potassium salt of the nitroparaffin may be prepared by utilizing potassium hydroxide. The reaction of the present invention is carried out in a solvent medium utilizing an inert solvent, that is to say a solvent which is inert to the reactants and the reaction products. Examples of such solvents are water, methanol, ethanol, propanol, butanol, etc., and the like. The use of methanol is preferred. A weight ratio of solvent to reactants of in excess of 2:1 for example in the range of about 5:1 to about 20:1 is typically employed.

The mole ratio of oxalic acid to nitroparaffin salt is of importance in the present invention. While oximes are obtained at lower ratios, best results are obtained when the mole ratio of oxalic acid to nitroparaffin salt is in excess of 1:1, for example in the range of about 2:1 to about 5:1.

The reaction is exothermic and requires no external source of heat. Typically the reaction is carried out at a temperature in the range of from about 15 to about 100° C. Temperatures in the range of about 25 to about 60° C. are preferred.

The oximes produced according to the process of the present invention may be recovered from the reaction medium by any suitable procedure. One such procedure involves neutralizing the reaction medium with a suitable base, then extracting the oxime from the neutralized medium with a suitable solvent for the oxime and finally removing the solvent from the oxime.

The invention will be understood more fully by reference to the following specific examples. It is understood that the examples are presented for purposes of illustration only and are not intended as a limitation of the invention.

Example 1

7.0 grams of 2-nitropropane and 5 grams of sodium hydroxide as pellets were added to 125 milliliters of methanol to form a solution. The solution was then slowly added to a solution of 11 grams of oxalic acid in 200 milliliters of methanol. The resulting reaction medium was then agitated for ninety minutes. The reaction medium was neutralized to a pH of 7.0 with aqueous sodium hydroxide and the neutralized reaction medium was extracted with ethyl ether. Acetone oxime was obtained.

Example 2

The procedure of Example 1 is repeated in all essential details with the exception that the potassium salt of 2-nitropentane is substituted for the sodium salt of 2-nitropropane. Methyl propyl ketoxime is obtained.

Example 3

The procedure of Example 1 is repeated in all essential details with the exception that the potassium salt of 2-nitrobutane is substituted for the sodium salt of 2-nitropropane. Methyl ethyl ketoxime is obtained.

Example 4

The procedure of Example 1 is repeated in all essential details with the exception that the sodium salt of 4-nitroheptane is substituted for the sodium salt of 2-nitropropane. Dipropyl ketoxime is obtained.

Since many embodiments of this invention may be made and since many changes may be made in the embodiments described, the foregoing is interpreted as illustrative and my invention is defined by the appended claims.

I claim:
1. A process for the production of oximes which comprises reacting a water-soluble alkali metal salt of a nitroparaffin with oxalic acid, the said nitroparaffin having the formula

wherein R is an alkyl radical having from 1 up to about 3 carbon atoms, at a temperature in the range of about 15 to about 100° C. in the presence of an inert solvent.

2. The process of claim 1 wherein the solvent is methanol.

3. The process of claim 1 wherein the temperature ranges from about 25 to about 60° C.

4. The process of claim 1 wherein the mole ratio of oxalic acid to nitroparaffin salt is in the range of 1:1 to 5:1.

5. The process of claim 1 wherein the nitroparaffin is 2-nitropropane.

6. The process of claim 1 wherein the nitroparaffin is 2-nitrobutane.

References Cited

UNITED STATES PATENTS 2,945,065   7/1960   Donaruma _____ 260—566

CHARLES B. PARKER, *Primary Examiner.*

R. V. HINES, *Assistant Examiner.*